US008312427B2

(12) United States Patent  (10) Patent No.: US 8,312,427 B2
Hutchison et al.  (45) Date of Patent: Nov. 13, 2012

(54) SELECTING A SET OF CANDIDATE CODE EXPRESSIONS FROM A SECTION OF PROGRAM CODE FOR COPYING

(75) Inventors: Gordon Douglas Hutchison, Eastleigh (GB); David Geoffrey Screen, Winchester (GB); Joseph Robert Winchester, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 12/098,480

(22) Filed: Apr. 7, 2008

(65) Prior Publication Data

US 2010/0325612 A1 Dec. 23, 2010

(30) Foreign Application Priority Data

May 15, 2007 (EP) .................................... 07108198

(51) Int. Cl.
*G06F 9/44* (2006.01)
(52) U.S. Cl. ......... 717/110; 717/113; 717/121; 717/125
(58) Field of Classification Search .................. None
See application file for complete search history.

(56) References Cited

U.S. PATENT DOCUMENTS

| 5,742,836 | A | * | 4/1998 | Turpin et al. .................. 715/224 |
| 5,838,941 | A | * | 11/1998 | Valentine et al. ............. 712/217 |
| 5,953,731 | A | | 9/1999 | Glaser |
| 5,966,539 | A | * | 10/1999 | Srivastava ..................... 717/156 |
| 6,026,241 | A | * | 2/2000 | Chow et al. .................... 717/152 |
| 6,077,314 | A | * | 6/2000 | Ng ................................. 717/159 |
| 6,243,859 | B1 | * | 6/2001 | Chen-Kuang .................. 717/111 |
| 6,286,135 | B1 | * | 9/2001 | Santhanam .................... 717/146 |
| 6,691,301 | B2 | * | 2/2004 | Bowen .......................... 717/114 |
| 6,966,054 | B2 | * | 11/2005 | Simonyi ........................ 717/144 |
| 7,716,642 | B1 | * | 5/2010 | Michael et al. ............... 717/124 |
| 7,890,851 | B1 | * | 2/2011 | Milton, Jr. .................... 715/224 |
| 2002/0095667 | A1 | * | 7/2002 | Archambault ................ 717/154 |
| 2004/0153992 | A1 | * | 8/2004 | Molina-Moreno et al. ... 717/105 |
| 2004/0225964 | A1 | * | 11/2004 | Simonyi ........................ 715/530 |
| 2005/0234887 | A1 | * | 10/2005 | Harako ............................ 707/3 |
| 2006/0236311 | A1 | * | 10/2006 | Chang et al. .................. 717/151 |
| 2007/0266366 | A1 | * | 11/2007 | Bucuvalas .................... 717/104 |
| 2008/0072210 | A1 | * | 3/2008 | Rush et al. .................... 717/121 |
| 2009/0083706 | A1 | * | 3/2009 | Kosov et al. .................. 717/113 |

OTHER PUBLICATIONS

Title: On detection of gapped code clones using gap locations, author: Ueda, Y. dated: 2002, source: IEEE.*
Title: CP-Miner: finding copy-paste and related bugs in large-scale software code, author: Li et al, dated: Marc 2006, source: IEEE.*

(Continued)

*Primary Examiner* — Chameli Das
(74) *Attorney, Agent, or Firm* — Cuenot, Forsythe & Kim, LLC

(57) ABSTRACT

To facilitate code building, a user can identify an expression to be copied at a position in a source section of program code. Occurrences of the user-selected expression form a set of candidate code expressions. The user-selected expression may include some or all occurrences of a variable within an enclosing scope in the source section, program statements, etc. The formed set of candidate code expressions is presented to the user for user selection of one or more of the expression occurrences within the set. The set occurrences selected by the user are pasted to one or more target locations.

15 Claims, 4 Drawing Sheets

OTHER PUBLICATIONS

NetBeans Copy Class Refactoring Module Tutorial (http://platform.netbeans.org/tutorials/nbm-refactoring.html)f, Dated: Oct. 28, 2005.
Glen Wallace et al, "Smarter cut-and-paste for programming text editors", ACM International Conference Proceeding Series, vol. 14, Proceedings of the 2nd Australasian conference on User Interface, Queensland, Australia, 2001, pp. 56-63.
Author: Miryung Kim, Vibha Sazawal, and David Notkin, "Supporting Uses of Editing Process Patterns", IUI Workshop, 2004 Available from http://www.research.ibm.com/iui-workshop/.
Author Unknown, Pattern by Example, Delta Software Technology GmbH, 2003. Available from http://www.delta-software-technology.com.

* cited by examiner

```
class Workshop {

Car car;
Workshop workshop;

init() {
        Workshop w=Workshop.getLocalGarage();      (202)
        System.out.println("Opening garage ...");  (203)
        w.setAnswerPhone(false);                   (204)
        w.setCallCustomersBack(false);             (205)
        w.open();                                  (206)
        car=new Car();                             (207)
        car.setWheels(4);                          (208)
        workshop=w;                                (209)

```
{
        String w=null;                             (402)
        Workshop w=Workshop.getLocalGarage();      (202)
        w.setCallCustomersBack(false);             (205)
        w.open();                                  (206)
}
```

Figure 4

… # SELECTING A SET OF CANDIDATE CODE EXPRESSIONS FROM A SECTION OF PROGRAM CODE FOR COPYING

CROSS-REFERENCE TO RELATED APPLICATIONS

This application claims priority to European Application No. 07108198.8, filed on May 15, 2007.

BACKGROUND OF THE INVENTION

The present invention relates to selecting a set of candidate code expressions from a section of program code for copying.

Program code for programmable devices such as software for computers is commonly created using a code editor application program that may be provided as a standalone program or as part of an integrated development environment (IDE). Many code editors provide facilities for copying sections of code from a source location and pasting the section of code to a target location.

One problem, however, is that lines of code required to be copied may be interspersed with other lines of code that are not required. In this case, the user is required to edit the pasted code, which is time consuming and error prone.

BRIEF SUMMARY OF THE INVENTION

The present invention may be embodied as a method for selecting a set of candidate code expressions from a section of program code. The user's selection of an expression at a position in the section of program code identifies occurrences of the expression to be copied. A set of candidate code expressions is identified that includes one or more further occurrences of the user-selected expression in an enclosing scope at the position in the section of program code at which the original selection was made. The set of candidate code expressions is copied.

The invention may also be embodied as an apparatus for selecting a set of candidate code expressions from a section of program code. The apparatus includes expression-identifying logic that responds to user input identifying an expression to be copied, set building logic for identifying a set of candidate code expressions that includes one or more further occurrences of the user-selected expression in an enclosing scope in the section of program code, and copying logic for copying the step of candidate code expressions.

The invention may also be embodied as a computer program product for selecting a set of candidate code expressions. The computer program product includes a computer usable media embodying computer usable program code configured to receive a user selection of an expression at a position in a section of program code, computer usable program code configured to identify a set of candidate code expressions including one or more further occurrences of the user-selected expression in an enclosing scope at the position, and computer usable program code configured to copy the identified set of candidate code expressions.

BRIEF DESCRIPTION OF THE SEVERAL VIEWS OF THE DRAWINGS

FIG. 2 is an example of existing program code in the software development system of FIG. 1.

FIG. 4 is an example of program code into which a selection of the candidate code expressions of FIG. 3 have been pasted.

DETAILED DESCRIPTION OF THE INVENTION

Figure 1:
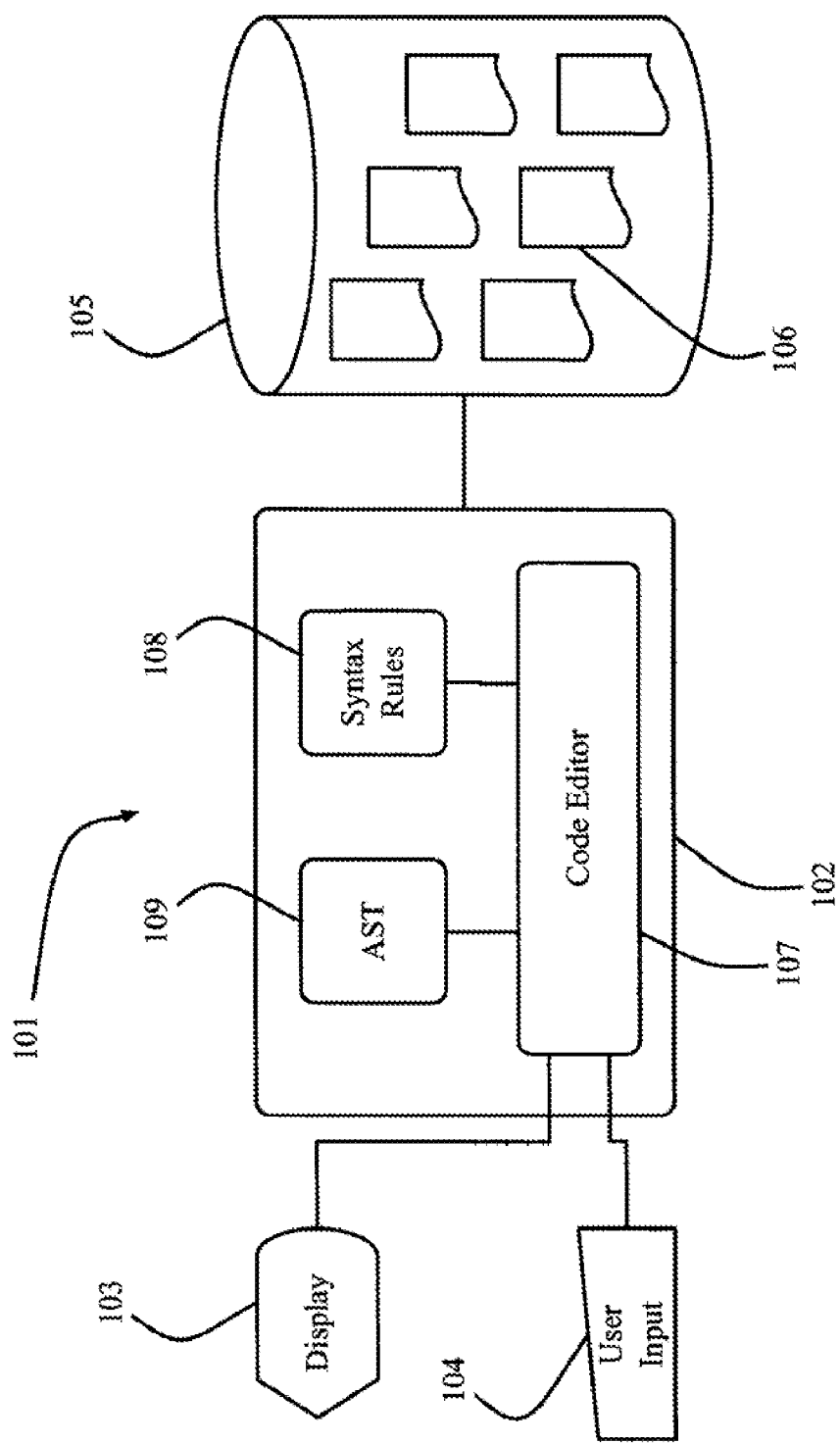
FIG. 1 is a schematic illustration of a software development system including a code editor.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference to FIG. 1, a software development system 101 includes a computer 102 connected to an output device in the form of a display 103 and input devices in the form of a keyboard and mouse 104. The computer 102 is also connected to a storage device in the form of a disk drive 105 used to store program code files 106. The computer 102 runs an application program in the form of a code editor 107, which enables a user to create and edit program code in the files 106. The code editor 107 is arranged to parse the program code as it is created or edited by a user in the code editor 107. The parsing is performed in accordance with a set of syntax rules 108 for the appropriate programming language and results in a representation of the syntax of the created program code in the form of an abstract syntax tree (AST) 109. The abstract syntax tree 109 thus provides a representation of the semantics of the section of program code to which it relates. In the present embodiment, the program code is created in the Java™ programming language.

The code editor 107 is arranged to provide a selective copy and paste feature, referred to herein as selective copy, which is invoked in response to a predetermined command from a user. A selective copy command indicates an expression in the program code, in the form of a variable. In response to the selective copy command, the code editor identifies a set of candidate code expressions including program code statements that include the same variable. In the present embodiment, only statements within the local scope at the given position are selected. That is statements within the immediately enclosing code block, as indicated in Java code by the enclosing brackets. The set of candidate code expressions is identified automatically by the code editor via a search of the abstract syntax tree 109. The set of candidate code expressions are displayed to the user to enable the user to select which expressions are to be inserted at a target paste position either in the section of program code from which the expressions were copied or in another section of program code.

FIG. 2 shows an example section of program code 106 in the form of a Java class definition 201 for a class named "WorkShop". The class "WorkShop" is considered to be part of a software program that is being edited by a user and from which the user wishes to copy all uses of the variable "w" in the immediately enclosing scope. In the present example, the user selects the occurrence of the variable "w" in line 204 of the code and enters the selective copy command. In response to this command, the code editor 107 selects every program code statement or line from the class 201 within the local scope, relative to the point of selection, containing a reference to the variable "w", to form the set of candidate code expressions.

Figure 3:
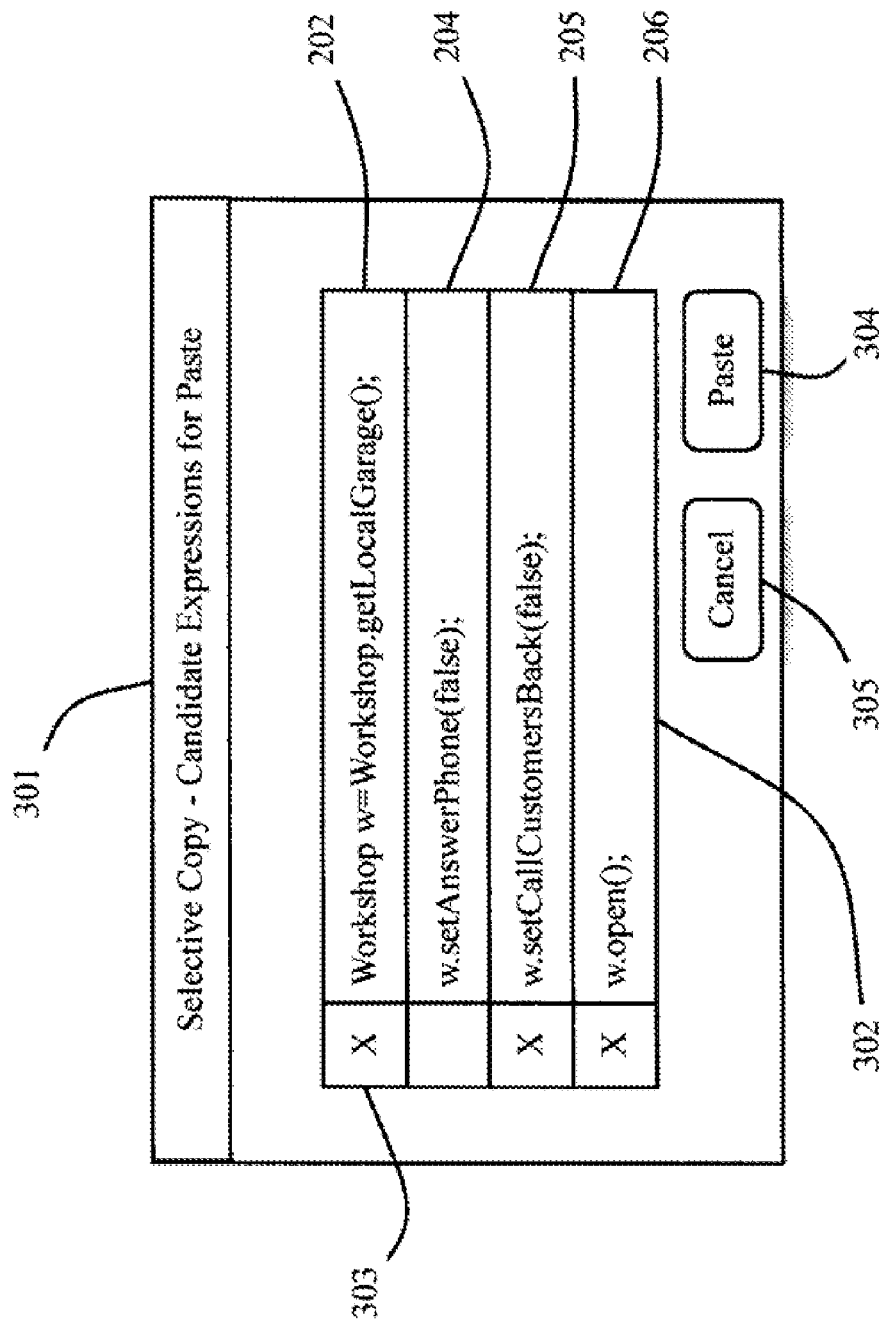
FIG. 3 is a set of candidate code expressions selected from the program code of FIG. 2 for copying to a different section of program code.

The set of candidate code expressions are then presented to the user, as shown in FIG. 3, in a pop up window 301 on the display 103. The window 301 comprises a list of the candidate code expressions 302, with each member in the list being provided with a check box 303. The check boxes 303 enable the user to select the corresponding candidate code expression 302 for use in the selective paste operation. Once the user has made any such selection, the pasting of the selected lines 302 is performed when the user operates a "paste" button 304 in the window 301. If the user wishes to abort the selective paste process a "cancel" button 305 is provided.

With reference to FIG. 4, in response to the operation of the "paste" button 304, the selected lines of code are pasted into a target location 401 indicated by the user. In the present embodiment, the target location is a window in which the user is writing a new section of code based on the class "WorkShop" 201. As shown in FIG. 4, the lines 202, 205, 206 from the class "WorkShop" 201 selected in the window 301 are pasted into the target location 401. The lines of the class "WorkShop" 201 that do not contain any reference to the variable "w", that is lines 203, 207, 208, 209, are not copied and the deselected line 204 is not pasted.

Figure 5:
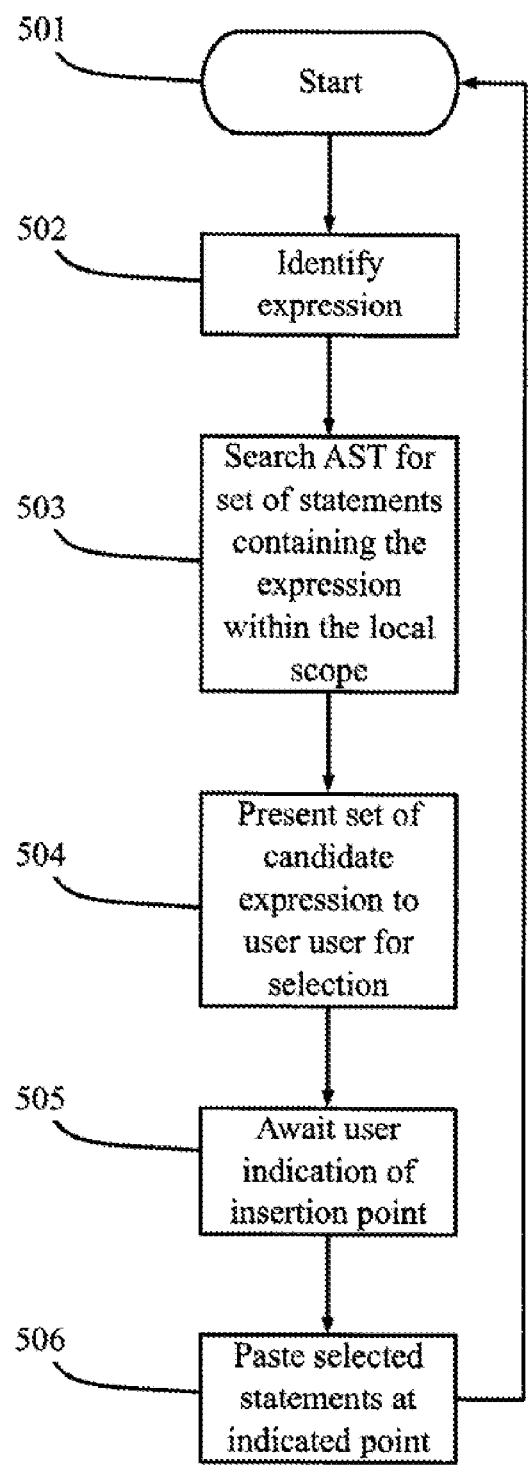
FIG. 5 is a flow chart illustrating the processing performed by the code editor of FIG. 1 when providing a set candidate code expressions for insertion in target program code.

The processing performed by the code editor 107 when performing the selective paste as described above will now be described in further detail with reference to the flow chart of FIG. 5. At step 501, processing is initiated by entry, via the input devices 104, of the selective copy command and processing moves to step 502. At step 502, the expression in the program code indicated in the selective copy command is identified and processing moves to step 503. At step 503, a search of the abstract syntax tree 109 is performed to identify all program code statements within the local scope that contain the identified expression. Any such identified program code statements comprise a set of candidate code expressions. Processing then moves to step 504 where the set of candidate code expressions is presented to the user and processing awaits user selection and input via the check boxes 303 and buttons 304, 305. In response to the operation of the "paste" button 304, processing moves to step 505 where the user selection of the paste target location is awaited. Once the target location is indicated, processing moves to step 506 where the selected candidate code expressions are pasted to the given location. Processing then returns to step 501 and proceeds as described above.

Thus a user is able to selectively copy a set of semantically related elements of program code from one location to another without a need to edit the pasted code to remove irrelevant lines or statements that may be interleaved with the desired, semantically related statements. Furthermore, the search for all relevant statements is performed automatically rather than manually, thus avoiding the accidental omission of semantically relevant statements from the relevant scope.

In another embodiment, only the statements from the variable declaration to the point of selection are copied into the target location. Any relevant lines after the point of selection would not be copied. However, if the user selects the declaration of the variable, then all relevant statements would be copied.

In a further embodiment, the variable is automatically renamed when pasting so as to avoid any clash with any existing variable in scope.

In another embodiment, the scope from which the set of candidate code expressions are selected may be varied. The scope may be the immediately enclosing scope or one or more further enclosing scopes. In a further embodiment, candidate code expressions are selected from all expressions in scope, that is, from all statements that are reachable or visible from a given code location and may include textually distant items outside of a current class such as superclass variables or methods.

In another embodiment, static or constructor blocks are automatically pasted to equivalent locations in the target location rather than the selected paste location.

In a further embodiment, the selective paste command is arranged to present the set of candidate code expressions for pasting at a plurality of different locations selected by the user. The set of candidate code expressions to be pasted at each of the plurality of locations may be the same for each location or may be different at one or more of the locations depending on the selections or de-selections of individual expressions by the user. In other words, the user may modify the set of code expressions depending on the target paste location.

As will be understood by those skilled in the art, the statements included in the set of candidate code expressions may include statements relating to the consumption of a variable, the construction or setup of a variable or variable declarations, field declarations, or method calls on the expression.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for selecting a set of candidate code expressions from a section of program code, comprising:
   receiving a user selection of an expression at a position in the section of program code, said user selection identifies an expression to be copied;
   identifying, using a processor, a set of candidate code expressions for copying, said set comprising one or more further occurrences of said user-selected expression in an enclosing scope at said position in said section of program code;
   copying said set of candidate code expressions;
   presenting said copied set of candidate code expressions to the user;
   receiving user input identifying candidate code expressions within said presented set; and
   pasting identified candidate code expressions within said presented set to at least one target location; wherein each occurrence of said expression is automatically renamed upon the occurrence being pasted to a target location to provide a unique name for the pasted occurrence for the scope at the target location.

2. The method according to claim 1, wherein said user-selected expression is a variable, and
   each expression in said set of candidate code expressions is a further occurrence of said variable.

3. The method according to claim 1, wherein each expression in said set of candidate code expression is a program statement comprising said user-selected expression.

4. The method according to claim 1, wherein said set of candidate code expressions comprises all occurrences of said user-selected expression in said enclosing scope.

5. The method according to 1, wherein said set of candidate code expressions comprises only occurrences of said user-selected expression upward of said position in said program code.

6. The method according to 1, wherein user selection includes a declaration for said expression, and the identifying the set of candidate code expressions includes selecting all occurrences of said expression.

7. An apparatus for selecting a set of candidate code expressions for copying from a section of program code, said apparatus comprising a processor including:

expression-identifying logic responsive to a user selection for identifying an expression to be copied from a section of program code;

set building logic for identifying a set of candidate code expressions to be copied, said set comprising one or more further occurrences of said user-selected expression in an enclosing scope in said section of program code;

copying logic for copying said set of candidate code expressions;

user input logic configured to receive user input identifying candidate code expressions in said presented set;

paste logic configured to copy identified candidate code expressions in said presented set to at least one target location; and a display for presenting said set of candidate code expressions to a user; wherein each occurrence of said expression is automatically renamed upon the occurrence being pasted to a target location to provide a unique name for the pasted occurrence for the scope at the target location.

8. An apparatus according to claim 7, wherein said selected expression is a variable, and each of said set of candidate code expressions is a further occurrence of said variable.

9. An apparatus according to claim 7, wherein each expression in said set of candidate code expression is a program statement comprising said user-selected expression.

10. A computer program product comprising a computer usable storage medium having stored therein computer usable program code for selecting a set of candidate code expressions, said computer usable program code, which when executed by a computer hardware system, causes the computer hardware system to perform:

receiving a user selection of an expression at a position in the section of program code that identifies an expression to be copied;

identifying a set of candidate code expressions for copying, said set comprising one or more further occurrences of said user-selected expression in an enclosing scope at said position in said section of program code;

copying said set of candidate code expressions;

presenting said copied set of candidate code expressions to the user;

receiving user input identifying candidate code expressions within said presented set; and pasting identified candidate code expressions within said presented set to at least one target location; wherein each occurrence of said expression is automatically renamed upon the occurrence being pasted to a target location to provide a unique name for the pasted occurrence for the scope at the target location.

11. The computer program product according to claim 10, wherein said user-selected expression is a variable and the identifying the set of candidate code expressions includes recognizing each occurrence of said variable.

12. The computer program product according to claim 10, wherein each expression in said set of candidate code expression is a program statement comprising said user-selected expression.

13. The computer program product according to claim 10, wherein said set of candidate code expressions comprises all occurrences of said user-selected expression in said enclosing scope.

14. The computer program product according to claim 10, wherein said set of candidate code expressions comprises only occurrences of said user-selected expression upward of said position in said program code.

15. The computer program product according to claim 10, wherein said user selection includes a declaration for said expression, and the identifying the set of candidate code expressions includes selecting all occurrences of said expression.

* * * * *